United States Patent
Xu

(10) Patent No.: US 10,067,365 B2
(45) Date of Patent: Sep. 4, 2018

(54) LIQUID CRYSTAL DISPLAY PANEL AND LIQUID CRYSTAL DISPLAY APPARATUS

(71) Applicant: SHENZHEN CHINA STAR OPTOELECTRONICS TECHNOLOGY CO. LTD, Guangdong (CN)

(72) Inventor: Fengcheng Xu, Guangdong (CN)

(73) Assignee: SHENZHEN CHINA STAR OPTOELECTRONICS TECHNOLOGY CO. LTD., Dongguan, Guangdong ( * ) Notice: Subject to any disclaimer, the term of this patent is extended or adjusted under 35 U.S.C. 154(b) by 119 days.

(21) Appl. No.: 14/772,390

(22) PCT Filed: May 18, 2015

(86) PCT No.: PCT/CN2015/079150
§ 371 (c)(1),
(2) Date: Sep. 3, 2015

(87) PCT Pub. No.: WO2016/179847
PCT Pub. Date: Nov. 17, 2016

(65) Prior Publication Data
US 2016/0334659 A1    Nov. 17, 2016

(30) Foreign Application Priority Data
May 11, 2015   (CN) .......................... 2015 1 0237560

(51) Int. Cl.
*G02F 1/133*    (2006.01)

(52) U.S. Cl.
CPC .... G02F 1/13306 (2013.01); *G02F 2201/121* (2013.01)

(58) Field of Classification Search
CPC ........... G02F 1/136286; G02F 1/13306; G02F 2201/121
See application file for complete search history.

(56) References Cited

U.S. PATENT DOCUMENTS

| 3,828,548 | A * | 8/1974 | Martin | G04C 9/00 327/220 |
| 8,283,875 | B2 * | 10/2012 | Grotkowski | H05B 33/0851 315/209 R |
| 8,368,322 | B2 * | 2/2013 | Yu | H05B 33/0827 315/306 |
| 9,888,540 | B2 * | 2/2018 | DeJonge | H05B 33/0815 |

(Continued)

FOREIGN PATENT DOCUMENTS

| CN | 101344657 | 1/2009 |
| CN | 202102695 U | 1/2012 |

(Continued)

*Primary Examiner* — Christopher E Leiby
(74) *Attorney, Agent, or Firm* — Mark M. Friedman

(57) ABSTRACT

A liquid crystal display panel and a liquid crystal display apparatus are provided. The liquid crystal display panel includes a driving circuit, wherein the driving circuit includes a power module for inputting an initial voltage to a common electrode, and a feedback unit for adjusting the initial voltage of the power module based upon the actual voltage at the common electrode, so that the actual voltage at the common electrode is equal to a preset voltage.

7 Claims, 2 Drawing Sheets

(56) References Cited

U.S. PATENT DOCUMENTS

| | | | |
|---|---|---|---|
| 2004/0195977 A1* | 10/2004 | Fischer | H05B 41/2853 |
| | | | 315/225 |
| 2006/0170640 A1* | 8/2006 | Okuno | G09G 3/3655 |
| | | | 345/98 |
| 2009/0015528 A1 | 1/2009 | Sheu | |
| 2009/0079724 A1 | 3/2009 | Dou | |
| 2010/0156872 A1* | 6/2010 | Pankaj | G09G 3/3696 |
| | | | 345/211 |

FOREIGN PATENT DOCUMENTS

| | | |
|---|---|---|
| JP | 2001103762 A | 4/2001 |
| TW | 200649199 A | 12/2006 |

* cited by examiner

LIQUID CRYSTAL DISPLAY PANEL AND LIQUID CRYSTAL DISPLAY APPARATUS

FIELD OF THE INVENTION

The present invention relates to the technical field of display technology, and in particular to a liquid crystal display panel and a liquid crystal display apparatus.

BACKGROUND OF THE INVENTION

Since a liquid crystal display panel generally comprises two upper and lower substrates which are disposed opposite each other, and parasitic capacitance exists at the data line on the lower substrate and at the common electrode on the upper substrate, when the voltage at the data line fluctuates, the parasitic capacitive coupling affects the voltage at the common electrode (VCOM). Due to the resistor-capacitor delay (RC delay), the voltage at the common electrode can not return to the preset value of the reference voltage source in a short time. The period when the voltage at the common electrode returns to the preset voltage is greater than the period when a data signal is written, which may cause crosstalk phenomenon and the display to malfunction.

The conventional method for stabilizing the voltage at the common electrode (VCOM) voltage primarily increases the driving capability of the voltage source of VCOM, so as to keep VCOM stabilized. However, not only does this stabilizing method increase the cost of the voltage source chip of VCOM, but also it is found that noise remains in the VCOM waveform.

Therefore, it is necessary to provide a liquid crystal panel display and a liquid crystal display apparatus to solve the problems of the prior art.

SUMMARY OF THE INVENTION

A primary object of the present invention is to provide a liquid crystal display panel and a liquid crystal display apparatus to resolve the technical problems of high cost and ineffectiveness of the method for stabilizing the voltage at the common electrode in the prior art.

To resolve the above technical problem, the present invention provides a liquid crystal display panel, comprising:

a first substrate comprising a plurality of data lines and a plurality of scan lines, and a plurality of pixel units defined by the data lines and the scan lines;

a second substrate disposed to face the first substrate, and comprising a common electrode; and a driving circuit comprising:

a power module having a first input terminal, which is used for inputting an initial voltage to the common electrode; and a feedback unit having a second input terminal, a first output terminal, and a third input terminal used for inputting a DC voltage; wherein the second input terminal used for inputting an actual voltage at the common electrode; the first output terminal used for inputting a feedback voltage to the first input terminal;

wherein when the actual voltage at the common electrode is higher than the preset voltage, the feedback unit is used for lowering the voltage at the first output terminal and processing the input voltage at the second input terminal to output the feedback voltage via the first output terminal based upon the input voltage at the third input electrode, so that the actual voltage at the common electrode is equal to the preset voltage;

wherein the first input terminal is connected with the common electrode, the first output terminal is connected with the first input terminal, and the second terminal is connected with the common electrode.

In the liquid crystal display panel of the present invention, when the actual voltage at the common electrode is lower than the preset voltage, the feedback unit is used for raising the voltage at the first output terminal.

In the liquid crystal display panel of the present invention, the feedback unit comprises a first resistor, a second resistor, a third resistor, and a transistor having an emitter electrode, a base electrode, and a collector electrode; the second input terminal is connected to the base electrode of the transistor via the first resistor; the emitter electrode of the transistor is grounded; the third input terminal is connected to the collector electrode of the transistor via the second resistor; a connection point is disposed between the second resistor and the collector electrode; one end of the third resistor is connected to the connection point; the other end of the third resistor is connected between the second input terminal and the first resistor; and the first output terminal is connected with the connection point.

In the liquid crystal display panel of the present invention, the first substrate is an array substrate, and the second substrate is a color filter substrate.

To resolve the above technical problem, the present invention provides a liquid crystal display panel, comprising:

a first substrate comprising a plurality of data lines and a plurality of scan lines, and a plurality of pixel units defined by the data lines and the scan lines;

a second substrate disposed to face the first substrate, and comprising a common electrode; and a driving circuit comprising:

a power module used for inputting an initial voltage to the common electrode; and a feedback unit used for adjusting the initial voltage of the power module based upon an actual voltage at the common electrode, so that the actual voltage at the common electrode is equal to a preset voltage.

In the liquid crystal display panel of the present invention, the power module has a first input terminal, which is used for inputting the initial voltage to the common electrode; and the feedback unit has a second input terminal, a first output terminal, wherein the second input terminal is used for inputting the actual voltage at the common electrode, and the first output terminal is used for inputting a feedback voltage to the first input terminal; wherein the first input terminal is connected with the common electrode, the first output terminal is connected with the first input terminal, and the second terminal is connected with the common electrode.

In the liquid crystal display panel of the present invention, when the actual voltage at the common electrode is higher than the preset voltage, the feedback unit is used for lowering the voltage at the first output terminal, and when the actual voltage at the common electrode is lower than the preset voltage, the feedback unit is used for raising the voltage at the first output terminal.

In the liquid crystal display panel of the present invention, the feedback unit further has a third input terminal used for inputting a DC voltage, and the feedback unit is further used for processing the input voltage at the second input terminal based upon the input voltage at the third input electrode, so that the actual voltage at the common electrode is equal to the preset voltage.

In the liquid crystal display panel of the present invention, the feedback unit comprises a first resistor, a second resistor, a third resistor, and a transistor having an emitter electrode, a base electrode, and a collector electrode; the second input terminal is connected to the base electrode of the transistor via the first resistor; the emitter electrode of the transistor is grounded; the third input terminal is connected to the collector electrode of the transistor via the second resistor; a connection point is disposed between the second resistor and the collector electrode; one end of the third resistor is connected to the connection point; the other end of the third resistor is connected between the second input terminal and the first resistor; and the first output terminal is connected with the connection point.

In the liquid crystal display panel of the present invention, the first substrate is an array substrate, and the second substrate is a color filter substrate.

A liquid crystal display apparatus, comprising:
a backlight module; and
a liquid crystal display panel, comprising
a first substrate comprising a plurality of data lines and a plurality of scan lines, and a plurality of pixel units defined by the data lines and the scan lines;
a second substrate disposed to face the first substrate, and comprising a common electrode; and
a driving circuit comprising:
a power module used for inputting an initial voltage to the common electrode; and
a feedback unit used for adjusting the initial voltage at the power module based upon an actual voltage at the common electrode, so that the actual voltage at the common electrode is equal to a preset voltage.

In the liquid crystal display apparatus of the present invention, the power module has a first input terminal, which is used for inputting the initial voltage to the common electrode; and the feedback unit has a second input terminal, a first output terminal, wherein the second input terminal is used for inputting the actual voltage at the common electrode, and the first output terminal is used for inputting a feedback voltage to the first input terminal; wherein the first input terminal is connected with the common electrode, the first output terminal is connected with the first input terminal, and the second terminal is connected with the common electrode.

In the liquid crystal display apparatus of the present invention, when the actual voltage at the common electrode is higher than the preset voltage, the feedback unit is used for lowering the voltage at the first output terminal, and when the actual voltage at the common electrode is lower than the preset voltage, the feedback unit is used for raising the voltage at the first output terminal.

In the liquid crystal display apparatus of the present invention, the feedback unit further has a third input terminal used for inputting a DC voltage, and the feedback unit is further used for processing the input voltage at the second input terminal based upon the input voltage at the third input electrode, so that the actual voltage at the common electrode is equal to the preset voltage.

In the liquid crystal display apparatus of the present invention, the feedback unit comprises a first resistor, a second resistor, a third resistor, and a transistor having an emitter electrode, a base electrode, and a collector electrode; the second input terminal is connected to the base electrode of the transistor via the first resistor; the emitter electrode of the transistor is grounded; the third input terminal is connected to the collector electrode of the transistor via the second resistor; a connection point is disposed between the second resistor and the collector electrode; one end of the third resistor is connected to the connection point; the other end of the third resistor is connected between the second input terminal and the first resistor; and the first output terminal is connected with the connection point.

The liquid crystal display panel and the liquid crystal display apparatus of the present invention keep the VCOM value stable by executing the real-time adjustment on the VCOM, thereby eliminating the crosstalk phenomenon and further enhancing the display effectiveness.

DETAILED DESCRIPTION OF THE PREFERRED EMBODIMENTS

The following description of the embodiments with reference to the accompanying drawings is used to illustrate particular embodiments of the present invention. The directional terms referred in the present invention, such as "upper", "lower", "front", "after", "left", "right", "inner", "outer", "side surface", etc. are only directions with regard to the accompanying drawings. Therefore, the directional trains used for describing and illustrating the present invention are not intended to limit the present invention. In the figures, the elements with similar structures are represented as the same reference number.

Figure 1:
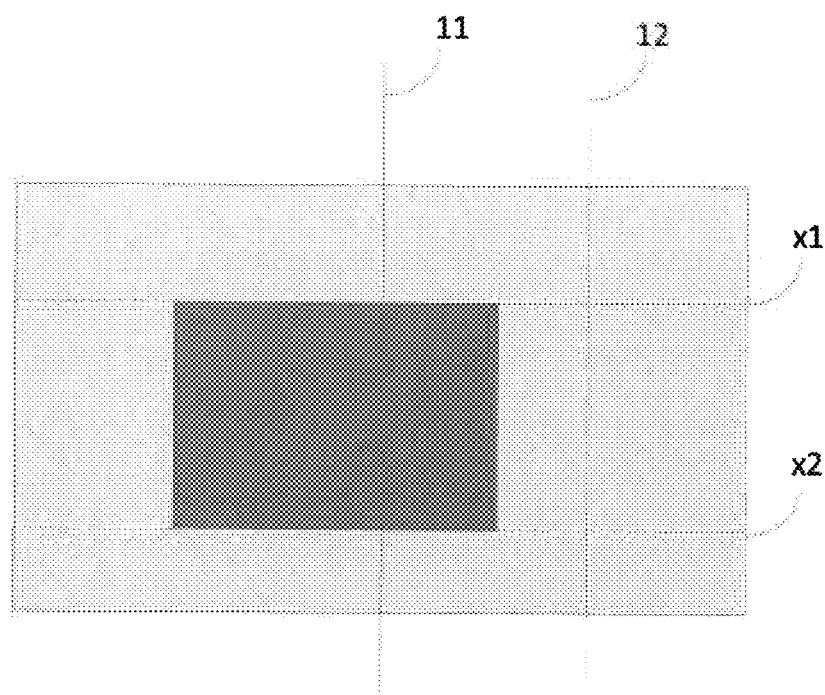
FIG. 1 is a schematic diagram of a liquid crystal display panel in a prior art in a gray scale test.

Please refer to FIG. 1, which is a schematic diagram of a conventional liquid crystal display panel under a grayscale test.

As shown in FIG. 1, when a conventional liquid crystal display panel is inputting a grayscale pattern of a black and gray test, the data line 11 inputs gray grayscale data at first, then inputs black grayscale data, and inputs gray grayscale data last. At the position x1, the gray grayscale data are converted to the black grayscale data. Since the voltages at a plurality of data lines decrease at the same time, the capacitive coupling effect causes the voltage at the common electrode to decrease. When the scan lines switch off, VCOM has not returned to the preset voltage yet, further causing the increase in the voltage difference between the pixel electrode and the common electrode. At the position x2, the black grayscale data are converted to the gray grayscale data. The voltages at a plurality of data lines increase at the same time, so that the voltage at the common electrode increases. When the scan lines switch off, VCOM has not returned to the preset voltage yet, further causing the variation in the voltage difference between the pixel electrode and the common electrode. Regarding the pixel at the data line 11, the black portion will be darker than the inputted grayscale; regarding the pixel at the data line 12, the gray portion will be darker than the inputted grayscale. Therefore, when the liquid crystal is being used, the crossover phenomenon appears.

Figure 2:
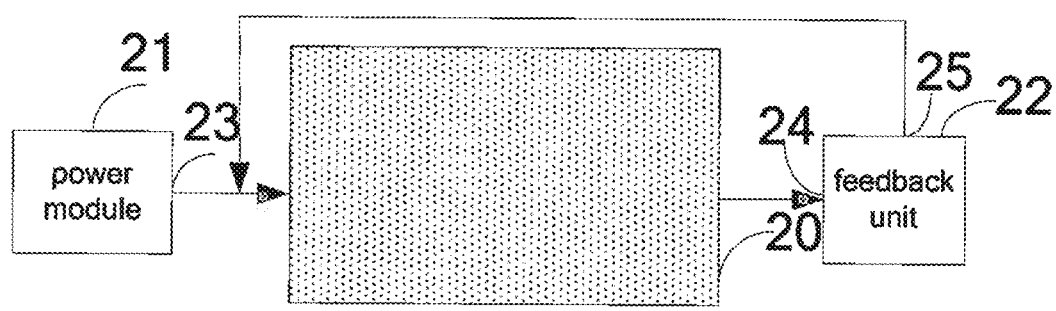
FIG. 2 is a structural schematic diagram of a driving circuit of the present invention.

Please refer to FIG. 2, which is a structural schematic diagram of a driving circuit of the present invention.

The liquid crystal display panel 20 of the present invention includes a first substrate, a second substrate, and a liquid crystal layer. The first substrate may be an array substrate, and the second substrate may be a color filter substrate. The first substrate includes multiple data lines, multiple scan lines, and multiple pixel units defined by the data lines and the scan lines. The first substrate may further include a pixel electrode. The second substrate and the first substrate are disposed to face each other. The second substrate includes a common electrode. The liquid crystal display panel 20 further includes a driving circuit.

The driving circuit includes a power module 21 and a feedback unit 22. The power module 21 is connected to the common electrode on the liquid crystal display panel 20, and provides an initial voltage for the common electrode. The feedback unit 22 is also connected to the common electrode for acquiring an actual voltage at the common electrode, and adjusting the initial voltage of the power module 21 based upon the actual voltage at the common electrode, so that the actual voltage at the common electrode is equal to a preset voltage.

The power module 21 has a first input terminal 23, and the feedback unit 22 has a second input terminal 24, and a first output terminal 25. The first input terminal 23 is connected to the common electrode, and the second input terminal 24 is also connected to the common electrode. The first output terminal 25 is connected with the first input terminal 23 of the power module 21.

The power module 21 inputs the initial voltage to the common electrode via the first input terminal 23. The second input terminal 24 inputs the actual input voltage at the common electrode. The first output terminal 25 inputs a feedback voltage to the first input terminal 23.

Figure 3:
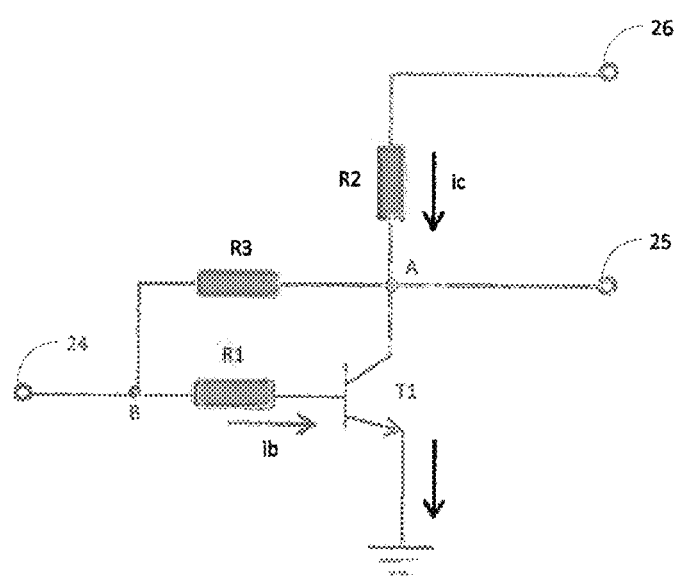
FIG. 3 is a circuit diagram of a feedback unit of a driving circuit of the present invention.

Preferably, the circuit diagram of the feedback unit is shown in FIG. 3. The feedback unit 22 further comprises a third input terminal 26 a first resistor R1, a second resistor R2, a third resistor R3, and the transistor T1. The transistor T1 has an emitter electrode, a base electrode, and a collector electrode.

In conjunction with FIG. 2, the second input terminal of the feedback unit 22 is connected to the base electrode of the transistor T1 via the first resistor R1. The emitter electrode of the transistor T1 is grounded. The third input terminal 26 is connected to the collector electrode of the transistor T1 via the second resistor R2. A connection point A is disposed between the second resistor R2 and the collector electrode. One end of the third resistor R3 is connected to the connection point A. A connection point B is disposed between the second input terminal 24 and the first resistor RI. The other end of the third resistor R3 is connected to the connection point B between the first input terminal and the first resistor. The first output terminal 25 is connected with the connection point A. The third input terminal 26 is connected to a DC power source for supplying the DC voltage, e.g. 16V, to the third input terminal 26.

The direction of the arrow in FIG. 3 indicates the flow of the current. When the actual voltage at the common electrode increases, and the voltage at the second input terminal 24, for example, is Vi. Since the second input terminal 24 inputs the actual voltage to the common electrode, the actual voltage at the common electrode increases, and the current ib at the base electrode of the transistor increases, so as to increase the current ic at the collector electrode of the transistor T1 at the same time, resulting in the voltage of R2 to increase, the voltage at the connection point A to decrease, and the voltage at the first output terminal 25 to decrease. Since the first output terminal 25 is connected to the first input terminal 23 of the power module 21 so that the voltage outputted by the power module 21 to the common electrode decreases. The actual voltage at the common electrode is more stabilized due to the feedback via the first output terminal 25.

When the actual voltage at the common electrode decreases, since the second input terminal 24 inputs the actual voltage to the common electrode, the actual voltage at the common electrode decreases, and the current ib at the base electrode of the transistor decreases, so as to decrease the current ic at the collector electrode of the transistor T1 at the same time, resulting in the voltage of R2 to decrease, the voltage at the connection point A to increase, and the voltage at the first output terminal 25 to increase. Since the first output terminal 25 is connected to the first input terminal 23 of the power module 21, the voltage outputted by the power module 21 to the common electrode increases. By the feedback effect of the first output terminal 25, the actual voltage at the common electrode is further stabilized.

By the feedback unit monitoring the voltage at the common electrode in real time, and adjusting the voltage at the common electrode to feedback to the power module, the liquid crystal display panel of the present invention keeps the voltage value at the common electrode stable, and prevents the capacitive coupling effect from influencing the voltage at the common electrode, thereby eliminating the crosstalk phenomenon and further enhancing the display effectiveness.

The present invention also provides a liquid crystal display apparatus, including a backlight module and a liquid crystal display panel. The liquid crystal display panel 20 of the present invention includes a first substrate, a second substrate, and a liquid crystal layer. The first substrate may be an array substrate, and the second substrate may be a color filter substrate. The first substrate includes multiple data lines, multiple scan lines, and multiple pixel units defined by the data lines and the scan lines. The first substrate may farther include a pixel electrode. The second substrate and the first substrate are disposed to face each other. The second substrate includes a common electrode. The liquid crystal display panel 20 further includes a driving circuit.

The driving circuit includes a power module 21 and a feedback unit 22. The power module 21 is connected to the common electrode on the liquid crystal display panel 20, and provides an initial voltage for the common electrode. The feedback unit 22 is also connected to the common electrode for acquiring an actual voltage at the common electrode, and adjusting the initial voltage of the power module 21 based upon the actual voltage at the common electrode, so that the actual voltage at the common electrode is equal to a preset voltage.

The power module 21 has a first input terminal 23, and the feedback unit 22 has a second input terminal 24, and a first output terminal 25. The first input terminal 23 is connected to the common electrode, and the second input terminal 24 is also connected to the common electrode. The first output terminal 25 is connected with the first input terminal 23 of the power module 21.

The power module 21 inputs the initial voltage to the common electrode via the first input terminal 23. The second input terminal 24 inputs the actual input voltage at the common electrode. The first output terminal 25 inputs a feedback voltage to the first input terminal 23.

Preferably, the circuit diagram of the feedback unit is shown in FIG. 3. The feedback unit 22 further comprises a third input terminal 26 a first resistor R1, a second resistor R2, a third resistor R3, and the transistor T1. The transistor T1 has an emitter electrode, a base electrode, and a collector electrode.

In conjunction with FIG. 2, the second input terminal of the feedback unit 22 is connected to the base electrode of the transistor T1 via the first resistor R1. The emitter electrode of the transistor T1 is grounded. The third input terminal 26 is connected to the collector electrode of the transistor T1 via the second resistor R2. A connection point A is disposed between the second resistor R2 and the collector electrode. One end of the third resistor R3 is connected to the connection point A. A connection point B is disposed between the second input terminal 24 and the first resistor R1. The other end of the third resistor R3 is connected to the connection point B between the first input terminal and the first resistor. The first output terminal 25 is connected with the connection point A. The third input terminal 26 is connected to a DC power source for supplying the DC voltage, e.g. 16V, to the third input terminal 26.

The direction of the arrow in FIG. 3 indicates the flow of the current. When the actual voltage at the common electrode increases, and the voltage at the second input terminal 24, for example, is Vi. Since the second input terminal 24 inputs the actual voltage to the common electrode, the actual voltage at the common electrode increases, and the current ib at the base electrode of the transistor increases, so as to increase the current is at the collector electrode of the transistor T1 at the same time, resulting in the voltage of R2 to increase, the voltage at the connection point A to decrease, and the voltage at the first output terminal 25 to decrease. Since the first output terminal 25 is connected to the first input terminal 23 of the power module 21 so that the voltage outputted by the power module 21 to the common electrode decreases. The actual voltage at the common electrode is more stabilized due to the feedback via the first output terminal 25.

When the actual voltage at the common electrode decreases, since the second input terminal 24 inputs the actual voltage to the common electrode, the actual voltage at the common electrode decreases, and the current ib at the base electrode of the transistor decreases, so as to decrease the current is at the collector electrode of the transistor T1 at the same time, resulting in the voltage of R2 to decrease, the voltage at the connection point A to increase, and the voltage at the first output terminal 25 to increase. Since the first output terminal 25 is connected to the first input terminal 23 of the power module 21, the voltage outputted by the power module 21 to the common electrode increases. By the feedback effect of the first output terminal 25, the actual voltage at the common electrode is further stabilized.

By the feedback unit monitoring the voltage at the common electrode in real time, and adjusting the voltage at the common electrode to feedback to the power module, the liquid crystal display panel of the present invention keeps the voltage value at the common electrode stable, and prevents the capacitive coupling effect from influencing the voltage at the common electrode, thereby eliminating the crosstalk phenomenon and further enhancing the display effectiveness.

In summary, although the preferred embodiments of the present invention have been disclosed above, the foregoing preferred embodiments of the present invention are not intended to limit the present invention. A person of ordinary skill in the art, without departing from the spirit and the scope of the invention, may make various modifications and variations. Therefore, the scope of the present invention is defined in the claims.

What is claimed is:

1. A liquid crystal display panel, comprising:
a first substrate comprising a plurality of data lines and a plurality of scan lines, and a plurality of pixel units defined by the data lines and the scan lines;
a second substrate disposed to face the first substrate, and comprising a common electrode; and
a driving circuit comprising:
a power module having a first input terminal, which is used for inputting an initial voltage to the common electrode; and
a feedback unit having a second input terminal, a first output terminal, and a third input terminal used for inputting a DC voltage; wherein the second input terminal used for inputting an actual voltage to the common electrode; the first output terminal used for inputting a feedback voltage to the first input terminal;
wherein when the actual voltage at the common electrode is higher than a preset voltage, the feedback unit is used for lowering the voltage at the first output terminal and processing the input voltage at the second input terminal to output the feedback voltage via the first output terminal based upon the input voltage at the third input terminal, so that the actual voltage at the common electrode is equal to the preset voltage;
wherein the first output terminal is directly connected with the first input terminal;
wherein the second input terminal is connected with the first output terminal via a third resistor, the first input terminal is connected with the common electrode;
wherein the feedback unit comprises a first resistor, a second resistor, the third resistor, and a transistor having an emitter electrode, a base electrode, and a collector electrode;
the second input terminal is connected to the base electrode of the transistor via the first resistor; the emitter electrode of the transistor is grounded; the third input terminal is connected to the collector electrode of the transistor via the second resistor; a connection point is disposed between the second resistor and the collector electrode; one end of the third resistor is connected to the connection point; the other end of the third resistor is connected between the second input terminal and the first resistor; and the first output terminal is connected with the connection point.

2. The liquid crystal display panel as claimed in claim 1, wherein when the actual voltage at the common electrode is lower than the preset voltage, the feedback unit is used for raising the voltage at the first output terminal.

3. The liquid crystal display panel as claimed in claim 1, wherein the first substrate is an array substrate, and the second substrate is a color filter substrate.

4. A liquid crystal display apparatus, comprising:
a backlight module; and
a liquid crystal display panel, comprising
a first substrate comprising a plurality of data lines and a plurality of scan lines, and a plurality of pixel units defined by the data lines and the scan lines;
a second substrate disposed to face the first substrate, and comprising a common electrode; and
a driving circuit comprising:
a power module used for inputting an initial voltage to the common electrode; and a feedback unit used for adjusting the initial voltage of the power module based upon an actual voltage at the common electrode, so that the actual voltage at the common electrode is equal to a preset voltage;

the power module has a first input terminal, which is used for inputting the initial voltage to the common electrode; and the feedback unit has a second input terminal, a first output terminal, wherein the second input terminal is used for inputting the actual voltage to the common electrode, and the first output terminal is used for inputting a feedback voltage to the first input terminal;

wherein the first output terminal is directly connected with the first input terminal;

wherein the second input terminal is connected with the first output terminal via a third resistor, the first input terminal is connected with the common electrode;

wherein the feedback unit further comprises a third input terminal used for inputting a DC voltage, and the feedback unit is further used for processing the input voltage at the second input terminal based upon the input voltage at the third input terminal, so that the actual voltage at the common electrode is equal to the preset voltage;

wherein the feedback unit comprises a first resistor, a second resistor, the third resistor, and a transistor having an emitter electrode, a base electrode, and a collector electrode;

the second input terminal is connected to the base electrode of the transistor via the first resistor; the emitter electrode of the transistor is grounded; the third input terminal is connected to the collector electrode of the transistor via the second resistor; a connection point is disposed between the second resistor and the collector electrode; one end of the third resistor is connected to the connection point; the other end of the third resistor is connected between the second input terminal and the first resistor; and the first output terminal is connected with the connection point.

5. The liquid crystal display apparatus as claimed in claim 4, wherein when the actual voltage at the common electrode is higher than the preset voltage, the feedback unit is used for lowering the voltage at the first output terminal, and when the actual voltage at the common electrode is lower than the preset voltage, the feedback unit is used for raising the voltage at the first output terminal.

6. The liquid crystal display panel as claimed in claim 4, wherein a connection point A is disposed between the second resistor and the collector electrode; one end of the third resistor is connected to the connection point A; a connection point B is disposed between the second input terminal and the first resistor, other end of the third resistor is connected to the connection point B between the first input terminal and the first resistor; the first output terminal is connected with the connection point A, the third input terminal is connected to a DC power source for supplying the DC voltage to the third input terminal.

7. A liquid crystal display panel, comprising:

a first substrate comprising a plurality of data lines and a plurality of scan lines, and a plurality of pixel units defined by the data lines and the scan lines;

a second substrate disposed to face the first substrate, and comprising a common electrode; and a driving circuit comprising:

a power module having a first input terminal, which is used for inputting an initial voltage to the common electrode; and a feedback unit having a second input terminal, a first output terminal, and a third input terminal used for inputting a DC voltage; wherein the second input terminal used for inputting an actual voltage to the common electrode; the first output terminal used for inputting a feedback voltage to the first input terminal;

wherein when the actual voltage at the common electrode is higher than a preset voltage, the feedback unit is used for lowering the voltage at the first output terminal and processing the input voltage at the second input terminal to output the feedback voltage via the first output terminal based upon the input voltage at the third input terminal, so that the actual voltage at the common electrode is equal to the preset voltage;

wherein the first output terminal is directly connected with the first input terminal;

wherein the second input terminal is connected with the first output terminal via a third resistor, the first input terminal is connected with the common electrode;

wherein the feedback unit further comprises a first resistor, a second resistor, and a transistor, the transistor has an emitter electrode, a base electrode, and a collector electrode;

the second input terminal of the feedback unit is connected to the base electrode of the transistor via the first resistor, the emitter electrode of the transistor is grounded, the third input terminal is connected to the collector electrode of the transistor via the second resistor; a connection point A is disposed between the second resistor and the collector electrode; one end of the third resistor is connected to the connection point A; a connection point B is disposed between the second input terminal and the first resistor, other end of the third resistor is connected to the connection point B between the first input terminal and the first resistor; the first output terminal is connected with the connection point A, the third input terminal is connected to a DC power source for supplying the DC voltage to the third input terminal.

* * * * *